United States Patent
Hughes

(10) Patent No.: US 8,274,167 B1
(45) Date of Patent: Sep. 25, 2012

(54) APPARATUS FOR UNDERWATER ENVIRONMENTAL ENERGY TRANSFER WITH A LONG LEAD ZIRCONATE TITANATE TRANSDUCER

(75) Inventor: Derke R. Hughes, Warwick, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 387 days.

(21) Appl. No.: 12/683,503

(22) Filed: Jan. 7, 2010

(51) Int. Cl.
*H02P 9/04* (2006.01)
(52) U.S. Cl. .............................. 290/42; 290/53
(58) Field of Classification Search ............... 290/43, 290/42, 53, 54, 1 R; 60/495–502, 505; 417/330–333
See application file for complete search history.

(56) References Cited

U.S. PATENT DOCUMENTS

| | | | |
|---|---|---|---|
| 4,486,869 A * | 12/1984 | Carter | 367/154 |
| 6,580,177 B1 * | 6/2003 | Hagood et al. | 290/1 R |
| 7,242,107 B1 * | 7/2007 | Dempster | 290/55 |
| 7,429,801 B2 * | 9/2008 | Adamson et al. | 290/1 R |
| 7,908,928 B2 * | 3/2011 | Vik et al. | 73/806 |

* cited by examiner

*Primary Examiner* — Tulsidas C Patel
*Assistant Examiner* — Viet Nguyen
(74) *Attorney, Agent, or Firm* — James M. Kasischke; Jean-Paul A. Nasser; Michael P. Stanley

(57) ABSTRACT

The invention as disclosed is an underwater based electric energy production system. A cable having a piezoelectric core is attached on one end thereof to a floating buoy and on the other end thereof to an anchor. The system is deployed in the water such that the cable extends vertically through a water column. Movement of the cable due to water current generates electric power that can be harvested and stored. The floating buoy can be at or near the water's surface and the anchor can but need not rest on the sea floor.

10 Claims, 1 Drawing Sheet

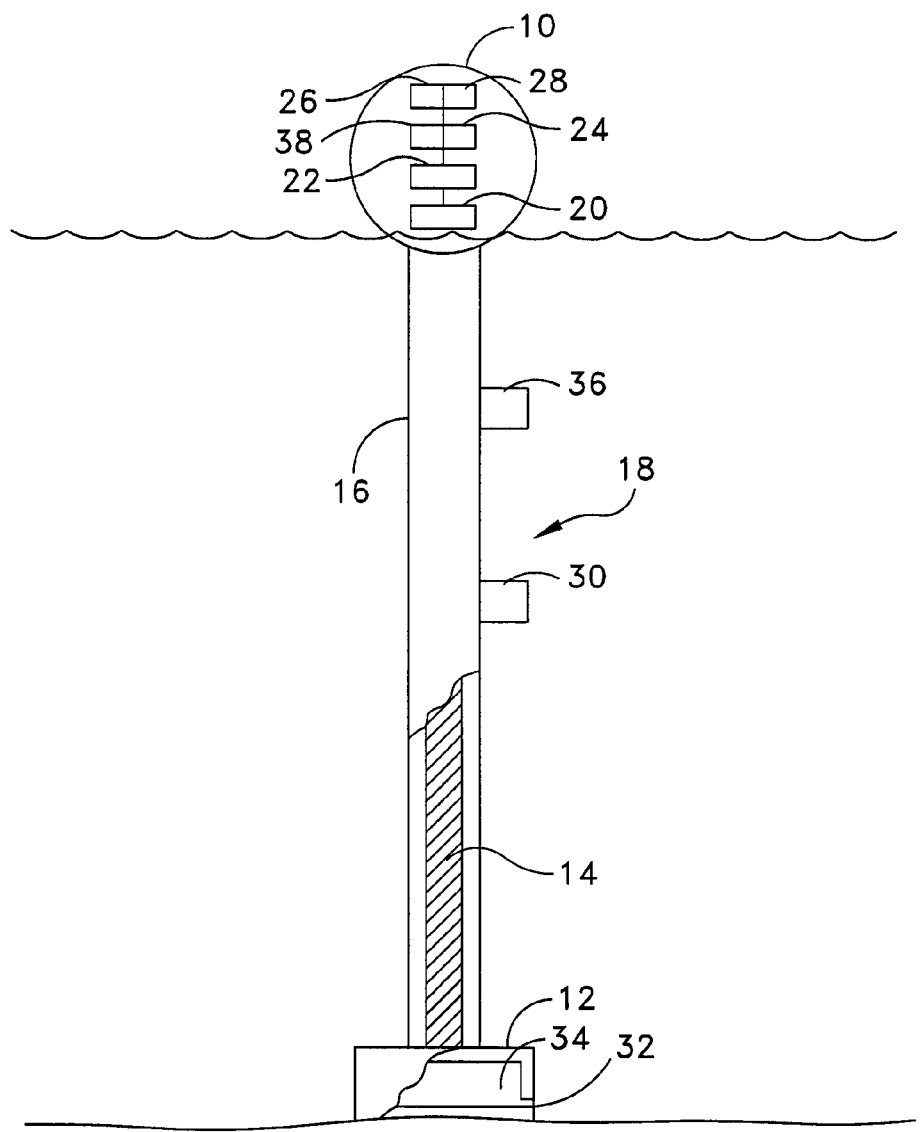

APPARATUS FOR UNDERWATER ENVIRONMENTAL ENERGY TRANSFER WITH A LONG LEAD ZIRCONATE TITANATE TRANSDUCER

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to underwater based electric energy production systems. In particular, the present invention is directed to a system for generating power from a lead zirconate titanate sonar transducer.

(2) Description of the Prior Art

The main mission for a long sonar transducer is the generation of certain acoustic tones in the ocean. One feature of lead zirconate titanate material is the voltage generation produced when this material is stressed. By taking advantage of this material property, the prospect exists for a long lead zirconate titanate transducer to become a power harvesting unit in an extended life capacity. By creating a trickle charging device, the mission life of dipping sonar or an airdropped transceiver could be extended. What is needed is a long transducer between ten and three hundred meters long, for environmental energy transfer that acquires energy from the ocean waves by bobbing on the water surface with a buoy and anchor system that vibrates at the strumming frequency generated by underwater currents thereby generating power, wherein the power can then be regulated by an alternating current to direct current converter and voltage regulator and captured by charging a battery such as a nickel cadmium battery.

SUMMARY OF THE INVENTION

It is a general purpose and object of the present invention to generate power from a sonar transducer that has a long lead zirconate titanate core within a cable such as an armored cable used in towed array systems.

The above object is accomplished with the present invention through the use of a long lead zirconate titanate cable for underwater environmental energy transfer, which acquires energy from the underwater currents by surrounding the long lead zirconate titanate cable with an armored cable and attaching it to a buoy and anchor system. As the buoy bobs on the water the lead zirconate titanate core experiences vibrations from underwater currents. These vibrations cause the lead zirconate titanate core to generate electrical power that is captured and regulated.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein:

FIG. 1 illustrates a buoy, anchor and cable system of the present invention.

DETAILED DESCRIPTION OF THE INVENTION

Referring to FIG. 1 there is illustrated a buoy 10 floating on the surface of the ocean or a large body of water, and an anchor 12 resting on the floor of the ocean or large body of water and used to keep the tension on a long (from 10 to 300 meters) lead zirconate titanate core 14 within a cable 16, such as a reinforced armored tow cable used in towed arrays, such that a fixed string configuration embodies a mathematical representation for the transducer cable system 18. The vertical configuration is adjustable to generate a variety of levels of energy because the draft on the anchor 12 and buoy 10 are regulated to produce different amounts of tension on the cable 16 based on the predetermined environmental conditions of the associated currents and sea states. In one embodiment, regulation of the tension can be accomplished through the use of a reservoir tank 34 within the anchor 12 and a valve 32 such that the process of opening and closing the valve regulates the amount of water in the reservoir thereby increasing the weight contained in the anchor 12 and thus controlling the amount of tension load on the cable 16. Regulating the tension on the cable 16 to adjust to the wave speed and natural frequencies in the water will alter the amount of mechanical energy created by the transducer cable system 18. A strain sensor 36 is mounted on the cable 16 and joined to a computer mother board 26 to measure the tension on the cable 16. Therefore, the transducer cable system 18 serves as an electromechanical generator that is tunable to produce enough power for a basic low power (i.e. 1 watt or less) sensor system.

A vibrating string contains both kinetic and potential energies. The total amount of energy for a string vibrating at frequency $\omega_n$ is expressed in equations (1a) and (1b) below:

$$E_n = \frac{1}{4}\rho_L L \omega_n^2 (A_m^2 + B_n^2) \tag{1a}$$

$$E_T = \sum_{n=1}^{N} E_n \tag{1b}$$

Equation (1a) is a simplification of the kinetic and potential energy per unit length of the string. The amplitude $A_n$ is the integration of the cosine terms associated with the solution at the nth frequency. The amplitude $B_n$ is associated with the nth solution of the sine term. The mass per unit length is $\rho_L$ where L is the length of the string. In equation (1b), the modal energies, $E_n$, of equation (1a) are summed for all modes N to obtain the total energy, $E_T$, associated with the string's vibration. The derivation assumes small strains for each element of the string. Therefore, an elastic material with large deflections like a rubber band could not utilize equations (1a) and (1b).

While equations (1a) and (1b) characterize the approximate mechanical energy for a string, the following equations calculate the energy translated into electrical energy. To calculate the estimated energy transfer the constitutive equations for material strain and its dielectric properties are computed from the following equations.

$$S = s \cdot T \tag{2a}$$

$$D = \in \cdot E \tag{2b}$$

The strains constitutive equation, (2a), is derived from Hooke's Law, but expressed in the inverse form where S is strain, s is compliance and T is stress. In the dielectric equivalent form equation, (2b), D is charge density, $\in$ is permittivity, and E is electric field. The constitutive equations are combined to from new equations, which represent the coupled constitutive equations for linear piezoelectric materials:

$$S = s^E T + dE \quad (3a)$$

$$D = dT + \in^T E \quad (3b)$$

One of the coupling terms is the compliance ($s^E$) of the material, which is the inverse of the modulus of elasticity. The piezoelectric constant (d) corresponds to the sensitivity of the material. The permittivity of the material is represented by $\in^T$. These coupling terms establish the relationships to compute the mechanical to electrical energy conversion for a piezoelectric system. To obtain the coupling efficiency of a mechanical to electrical energy conversion for a vibrating structure the following equation is used:

$$k = \sqrt{\frac{d^2}{s^E \varepsilon^T}} \quad (4)$$

Where k is the coupling factor for the stored mechanical energy over the input electrical energy.

This invention is a system that keeps a long lead zirconate titanate core 14 within an armored cable 16 in such tension that the fixed string equation and boundary conditions described above are sufficient to describe the modes and energy generation within the cable. The total energy computation considers the tension, cross-sectional area, current speed, and wave periodicity to describe the amount of power potentially available from the system. In general, the total energy increases with frequency, although, very high modes in the kilohertz (kHz) range are associated with decreasing energy. Environmental conditions producing such high frequencies are unlikely within typical sea states. The combination of more tension, relatively higher modes, and complicated mixed modes generates power that can then be regulated by an alternating current to direct current converter 20 and voltage regulator 22 and captured by charging a battery 24 such as a nickel cadmium battery that can power a low powered sensor suite 38.

In one embodiment, the present invention only needs to produce one watt of power or less to function. Microprocessor and data acquisition board combinations 26 often operate at 200 mW. Since the present invention is not a stand alone device, it may also function for several days in the same general location performing its mission as a long transducer array. For example, approximately 0.5 W of power are consumed in a two second interval. After frictional losses and unforeseen conditions the power could drop to 5 mW, which is two orders of magnitude. An hour mission in environmental conditions with the same physical loads would generate 9 W despite these additional losses. In one embodiment, the microprocessor and data acquisition board combinations 26 are a GUMSTIX® computer, which operates with approximately 1.0 W load with a standard electronics configuration. Therefore, data acquisition can be performed by the GUMSTIX® until the cyclical loading damages the rechargeable battery 24 or during a long duration of stagnant ocean. In addition, with the remaining wattage available, less than 1.0 W of power could be used for radio frequency transmission from a radio 28, such as a 900 MHz radio, so that information gathered by the GUMSTIX® computer can be transmitted off of the system 18.

After deploying the apparatus in the configuration illustrated in FIG. 1, the intention is to maintain a sufficient amount of power generation as represented by $E_T$ to accomplish a predetermined specific task, such as powering a sensor suite. This can involve monitoring and adjusting the tension on cable 16 in response to wave speed and current to optimize the total energy, $E_T$, associated with the string's vibration. The value of optimum tension $P_T$ is predetermined prior to deploying the apparatus of system 18 and is based on specifications of the cable and the current, wave speed, and sea states of the body of water where the apparatus of system 18 is deployed. The predetermined tension $P_T$ for the cable 16 is designed to allow the cable 16 to operate in common sea states 0-3, and is largely determined by the static tension of the cable 16. Higher sea states cause more horizontal forces to act on the buoy and anchor, which in turn does not yield as consistent a strumming motion on the cable 16. The dynamic tension of cable 16 is also crucial in creating the piezoelectric strain required to generate the desired power.

The method of operation of the apparatus of the present invention based on the above stated intention to maintain a sufficient amount of power generation comprises the following steps. The first step of the method is to take a periodic measurement the speed U of the water current flowing over the diameter D of cable 16. This measurement can be taken by the velocity sensor 30 and relayed to the processor 26. If the velocity is within the range of the predetermined sea state, then no further action needs to be taken. After a specified period of time another periodic measurement is taken. If the velocity is determined by processor 26 to be outside of the range of a predetermined sea state, then the next step is for the processor 26 to associate a strum frequency $f_s$ with the current flowing over the diameter of cable 16 according to the following equation:

$$f_s = Str U/D \quad (5)$$

where the Str variable refers to Strouhal's number, which is derived from the Reynold's number Re. The Reynold's number is shown by Equation (6):

$$Re = UD/v \quad (6)$$

The variable U stands for velocity current or flow across a diameter D of the cable 16, and v is the kinematic viscosity. These fluid dynamic constants are common terms used to describe flow over a surface.

The next step is for the processor to substitute $f_s$ as $\omega_n$ in equations (1a) and (1b) above to get determinative energy associated with the strum that is the main overall frequency mode that cable 16 is in. The next step is for processor 26 to solve for $E_T$, which indicates the energy being produced by the system 18 at the time of the water current measurement. Based on the value of $E_T$ processor 26 determines if a sufficient amount of power is being generated to accomplish a specified task, for example the operation of a GUMSTIX® computer, which operates with approximately 1.0 W load as mentioned above. If the determination indicates that there is an insufficient amount of power then the tension in the cable 16 is incrementally adjusted by adding water into the reservoir 34 in the anchor 12. In one embodiment, the water can be added by having valve 32 electro-mechanically actuated by a control signal from processor 26. These method steps are repeated periodically to keep the system 18 tuned to the surrounding underwater environment.

The advantage of the present invention is that the lead zirconate titanate core material for a cable could operate as a sensor, transducer, and an energy generation source. By combining the appropriate electronics, this invention allows for the possibility of a sonar array, which makes it a multi-functional self powered sensor. Additionally, the present invention offers the possibility to support a distributed network system infrastructure by extending the operation life of a multi-functional sensor suite.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An underwater electric energy production system comprising:
    a buoy, wherein said buoy is situated on a surface of a large body of water so as to float on the surface;
    a cable capable of surrounding a core, said cable having a first end and a second end, wherein the first end of said cable is joined to said buoy;
    a lead zirconate titanate core surrounded by said cable, wherein said lead zirconate titanate core functions as a piezoelectric transducer capable of generating electricity from vibrations from underwater currents;
    an anchor joined to said second end of said cable submerged in the large body of water, wherein said anchor is used to keep the tension on the lead zirconate titanate core within the cable, such that a fixed string configuration embodies a mathematical representation for the cable wherein the strain on the cable is expressed as $S=s^E T+dE$ and the charge density is expressed as $D=dT+e^T E$, wherein the vertical configuration is adjustable to generate a variety of levels of energy because the draft on the anchor and buoy can be regulated to produce different amounts of tension on the cable, wherein the coupling efficiency of the mechanical to electrical energy conversion for the vibrating lead zirconate titanate core is expressed as $$k=\sqrt{\frac{d^2}{s^E \varepsilon^T}};$$

a voltage regulator joined to said lead zirconate titanate core that receive an alternating current of electricity and regulates the voltage of the alternating current;
    an alternating current to direct current converter joined to said voltage regulator for the purpose of converting the electrical current generated by said lead zirconate titanate core from alternating current to direct current;
    a battery joined to said alternating current to direct current converter to capture and store the converted current; and
    a microprocessor and data acquisition board joined to said battery wherein said microprocessor and data acquisition board compiles and processes data generated in the form of voltage measurements from the lead zirconate titanate core.

2. The system of claim 1 wherein the total energy computation of the system is directly related to a tension on said cable, a cross-sectional area of said core, a current speed of the large body of water, and wave periodicity of the large body of water to describe the amount of power potentially available from the underwater electric energy production system.

3. The system of claim 1 wherein said cable surrounding said lead zirconate titanate core is between 10 meters and 300 meters long.

4. The system of claim 1 wherein said cable is a reinforced armored tow cable.

5. The system of claim 1 further comprising a velocity sensor joined to the cable and microprocessor wherein the velocity sensor can measure the velocity of the water current of the large body of water.

6. The system of claim 1 further comprising a strain sensor joined to the cable and microprocessor wherein the strain sensor can measure the tension on the cable.

7. The system of claim 1 further comprising:
    a reservoir tank located in the anchor capable of holding water; and
    a valve joined to the reservoir tank that will allow water into the reservoir tank, wherein actuation of the valve is controlled by the microprocessor.

8. The system of claim 1 wherein the battery that captures the electric current is a nickel cadmium battery.

9. The system of claim 7 further comprising a sensor suite joined to the nickel cadmium battery.

10. The system of claim 8 further comprising a 900 MHz radio joined to said nickel cadmium battery and to said microprocessor wherein said radio can transmit information gathered by the sensor suite.

\* \* \* \* \*